March 3, 1970  A. G. RICHARDS  3,499,146
VARIABLE DEPTH LAMINAGRAPHY WITH MEANS FOR HIGHLIGHTING
THE DETAIL OF SELECTED LAMINA
Filed Oct. 10, 1966  4 Sheets-Sheet 1
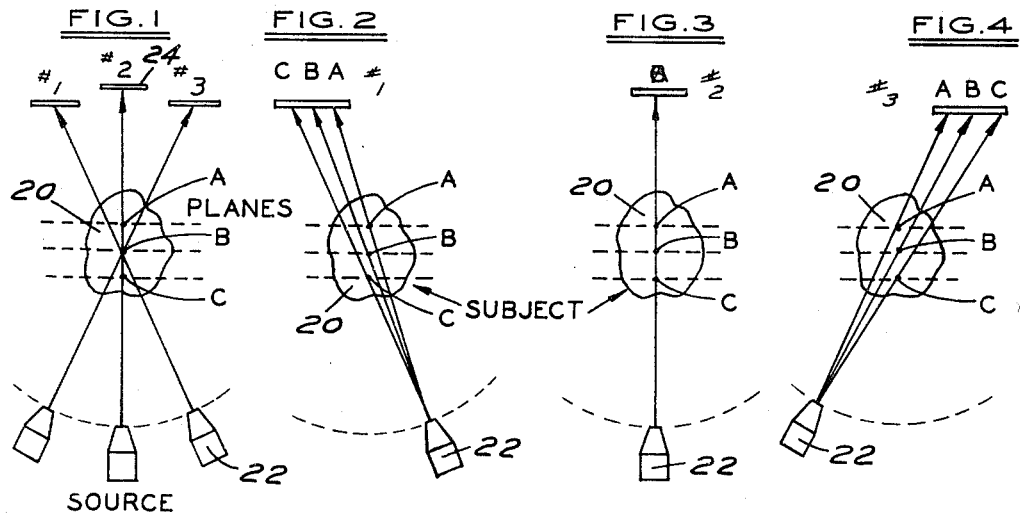
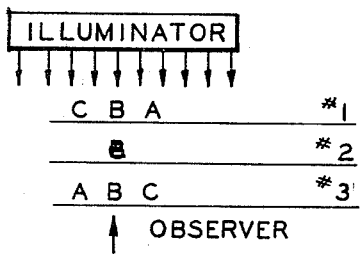
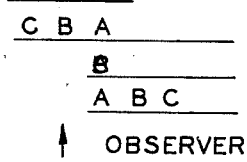
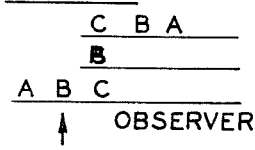
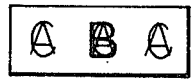
FIG.6
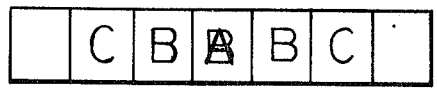
FIG.8
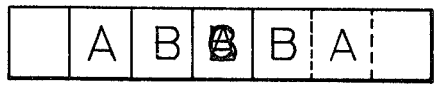
FIG.10
INVENTOR
ALBERT G. RICHARDS
BY
Barnes, Kisselle, Raisch & Choate
ATTORNEYS

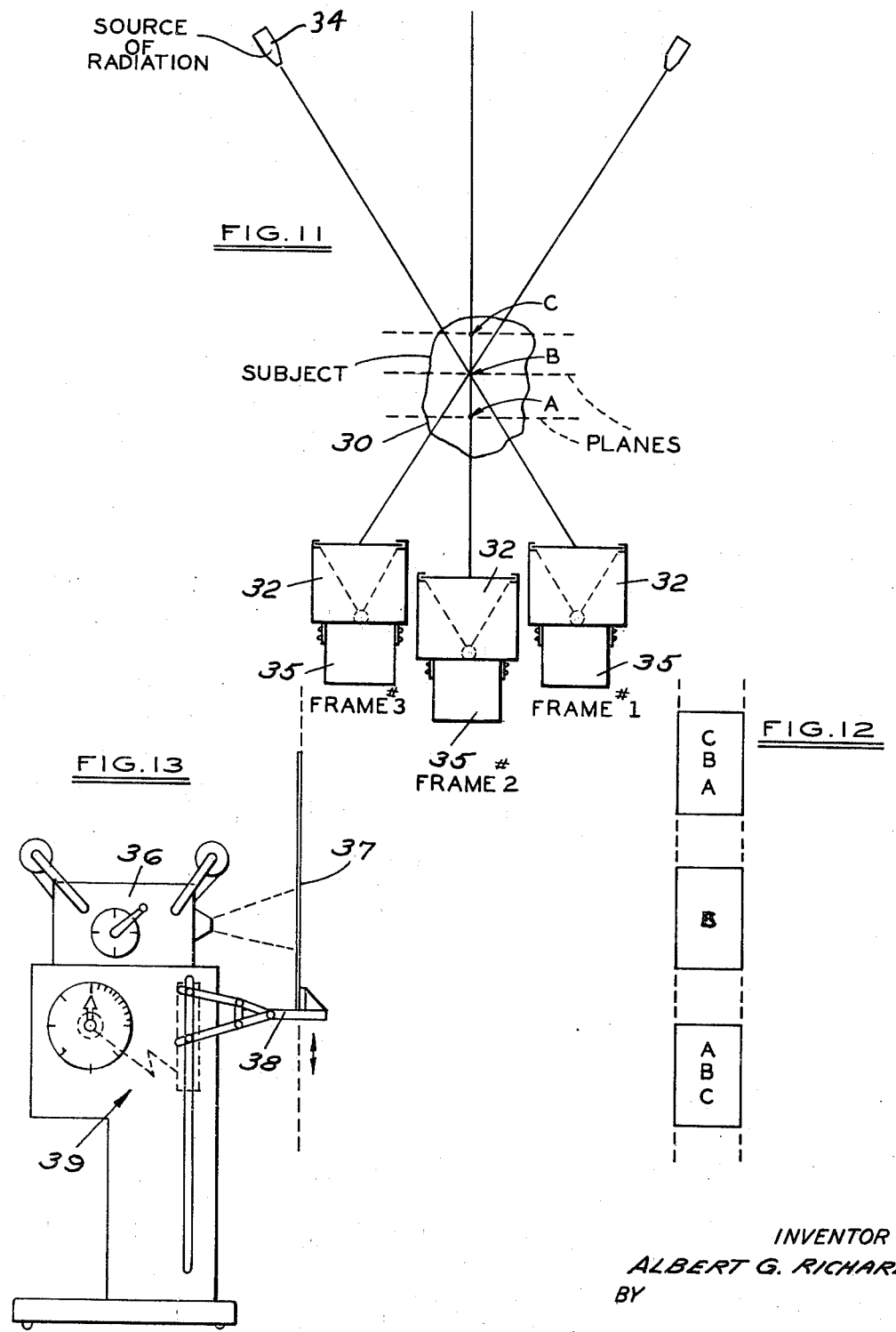

March 3, 1970  A. G. RICHARDS  3,499,146
VARIABLE DEPTH LAMINAGRAPHY WITH MEANS FOR HIGHLIGHTING
THE DETAIL OF SELECTED LAMINA
Filed Oct. 10, 1966  4 Sheets-Sheet 3

INVENTOR
ALBERT G. RICHARDS
BY
Barnes, Kisselle, Raisch & Choate
ATTORNEYS

# United States Patent Office 3,499,146
Patented Mar. 3, 1970

3,499,146
VARIABLE DEPTH LAMINAGRAPHY WITH
MEANS FOR HIGHLIGHTING THE DETAIL OF SELECTED LAMINA
Albert G. Richards, 395 Rock Creek Drive,
Ann Arbor, Mich. 48104
Filed Oct. 10, 1966, Ser. No. 585,582
Int. Cl. G01n 23/02
U.S. Cl. 250—61.5                                              15 Claims

ABSTRACT OF THE DISCLOSURE

A method of obtaining laminal detail within a three-dimensional subject using the results of radiological exposures of the subject comprising the taking of radiological information by exposing the subject at various spaced positions on one side and recording the resultant ray transmission at a plurality of similarly spaced positions on the other side of the subject, then utilizing the resultant multiple records in superimposition and various positions of planar shift to cause registry of the exposures of detail in any one plane and thus highlight the detail of that selected plane, the recording to include film or electronic recording, the latter type recording permitting reconstruction of laminal planes in X, Y, or Z directions of the subject.

---

This invention relates to variable depth laminagraphy and more particularly to the use of a source of penetrating radiation, such as X-rays, in a laminagraphic system which can present selectively many images of the details in any desired plane of the subject.

It is an object of the present invention to provide a system for radiographing a subject in a manner which permits reconstruction of the images of details in a plane at any particular selected depth within the subject.

Conventional radiographs of an object such as a human head, for example, present a two-dimensional representation of a three-dimensional subject. It is common knowledge to use laminagraphy in X-ray exploration wherein the X-ray source and the film are moved in opposite directions during the exposure. The general system is to maintain a rigid linkage between the ray source and the film with the center of rotation of the connecting link lying in that plane of the subject which is to be recorded in the laminagraph. Linear movement of the source and the film is the simplest to achieve but in some instances, desired results are obtainable with circular, spiral, elliptical or hypocycloidal movement.

Actually a laminagraphic film serves as an integrating device which records all of the images which are cast on it during the motion of the system. If, for example, a one-second exposure is used with a self-rectified X-ray tube operated with a 60-cycle current, the resultant picture is the summation of 60 brief exposures during which the X-ray source and the film were in 60 different positions. One selected portion of the subject, however, will be recorded in greater detail than the other portions of the subject because of its location relative to the axis of the movement. The images of the other portions of the subject are recorded in an underexposed and blurred manner but offer minimal interference with the properly exposed image. Blurring or lack of coincidence of the images of the non-selected portions of the subject increases with the distance from the selected portion which contains the axis of rotation of the linkage.

It is an object of the present invention to utilize the basic principle of laminagraphy to provide a plurality of images of laminae of a particular subject and further to make it possible to recall these images in such a manner that the images of the details of the subject in any particular lamina may be reconstructed rather than just those at the plane of axis of rotation.

It is, therefore, an object of the present invention to provide a laminagraphic system together with a recording system and reconstruction system which permits selective recall and reconstruction of the images of details in any particular plane or surface of the opaque subject being examined.

It is a further object to provide a system of laminagraphy which can utilize a plurality of recording media such as successive film shots, moving film frames, or X-ray image intensifier with suitable information storage and retrieval modules.

It is also an object of the invention to provide laminagraphic system wherein data regarding parallel laminae of a particular subject in a selected orientation, e.g., horizontal, can be recorded, scanned, and stored in such a manner as to permit recall of the data regarding a selected lamina, curved or planar, at any other selected orientation, e.g. vertical.

It is another object of the invention to disclose a system of laminagraphy which utilizes a single operation of recording to obtain information for all planes of the subject and to permit selective recall by planar shift of the various seriatim recordings to register simultaneously the images of a selected plane in the subject.

Other objects and features of the invention will be apparent in the following description and claims in which the principles and the manner of use of the invention are set forth in the best mode presently contemplated.

Drawings accompany the disclosure and the various views thereof may be briefly described as:

FIGURE 1 illustrates diagrammatically the manner in which a ray source will be related to a recording film in an exemplary laminagraphic system.

FIGURES 2, 3 and 4 illustrate different positions of the system as it moves through its cycle.

FIGURE 5 illustrates the manner in which a plurality of films would be illuminated and viewed.

FIGURE 6 illustrates the result of the illumination with the films in a certain position.

FIGURES 7 to 10 illustrate respectively a same series of films in different positions.

FIGURE 11 illustrates the manner in which the device may be used with a movie camera recording system focused on a fluorescent screen.

FIGURE 12 diagrammatically illustrates output from a laminagraphic procedure as recorded on successive frames of movie film.

FIGURE 13 illustrates a movie projector and synchronized screen to permit reconstruction of selected views.

Figure 14:
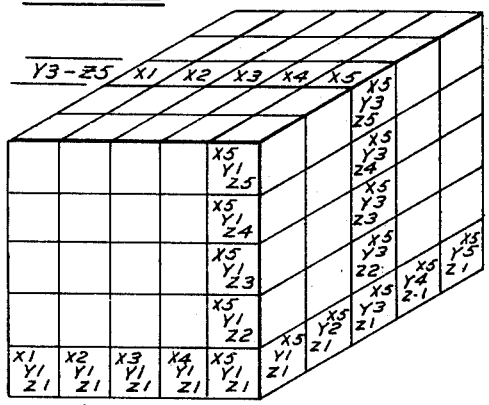

FIGURE 14 illustrates the manner in which an object can be analyzed by the disclosed system.

Figure 15:
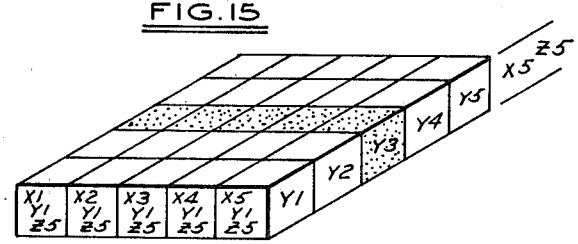

FIGURE 15 shows a top lamina of the recorded object.

Figure 16:
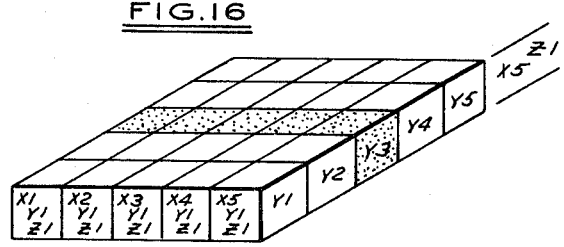

FIGURE 16 shows a bottom lamina of the recorded object.

Figure 17:
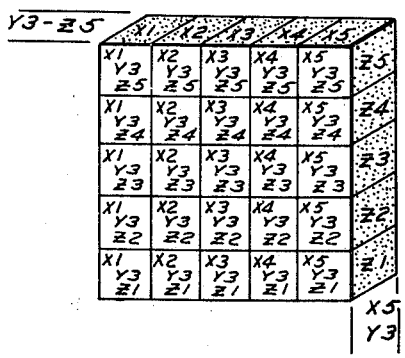

FIGURE 17 illustrates a vertical lamina reconstructed from information received from the horizontal lamina.

Figure 18:
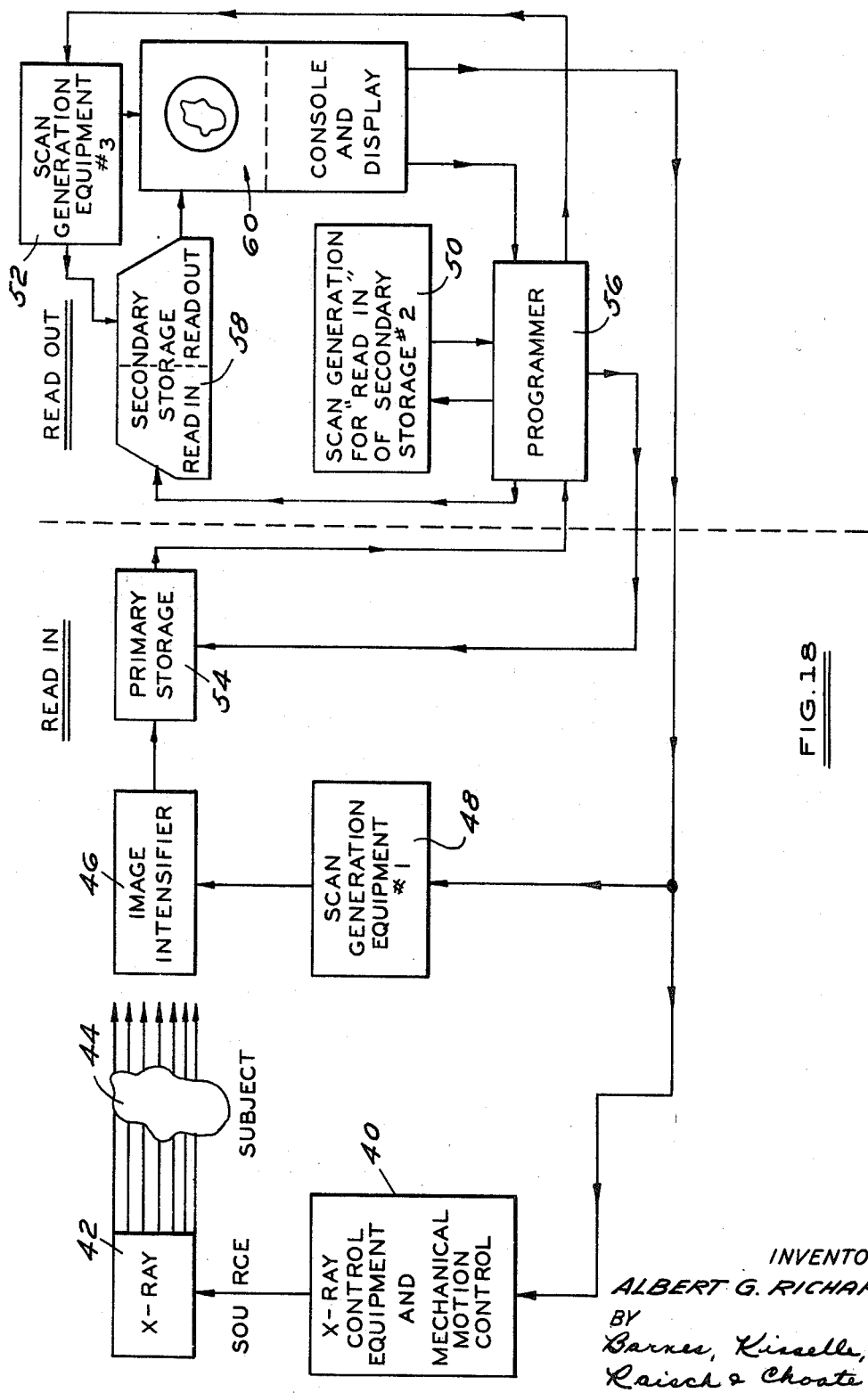

FIGURE 18 illustrates a module circuit and a system for electronic recording and redisplaying selected views.

To illustrate basically the principle of laminagraphic radiology, in FIGURE 1 a beam of penetrating radiation, e.g., X-rays is shown passing through a subject 20 wherein letters A, B and C represent three details lying in planes at different depths in the object. The rigid linkage (not shown) which connects the ray source 22 and the film holder 24 in which successive films may be placed rotates about an axis which is perpendicular to the plane of the drawing at point R. This is accomplished by the laminagraphic linkage which is known to the art. The three films 1, 2 and 3 are provided for receiving one-third of the normal exposure. The image of detail B is always projected at the center of the film whereas the images at A and C are projected at three different areas on the three films as shown by FIGURES 2, 3 and 4.

After processing, the three films may be assembled as a sandwich which is viewed as a unit as shown in FIGURE 5. To the observer the view shown in FIGURE 6 would appear with the film stacked upon each other as shown in FIGURE 5 with a heavy and sharp exposure of the B area, the central on-axis plane, with lighter and more blurred images of A and C at each side. If on the other hand, the films are shifted relative to each other as shown in FIGURE 7, the image A can be brought sharply into prominence before the observer as shown in FIGURE 8. Similarly, if they are shifted as shown in FIGURE 9, the image C comes sharply into prominence before the observer, while the other details A and B appear blurred and underexposed. In other words, by viewing the three under exposed X-ray pictures in certain orientations, the images of details, located at various depths in the subject, can be seen clearly. Utilizing this principle, if in place of the three films used in the previous assembly there were 60 films exposed while the source moved through 60 different positions, and then these 60 films were oriented as shown in FIGURE 5, for example, the result would appear as a standard laminagraph in which all details lying in the plane containing the axis of rotation of the linkage would appear reasonably sharp and fully exposed while all the other details would appear indistinct. Thus, the images of a particular plane in the subject appear in each film at a different position from the next adjacent film and so on. By bringing into register the images of a particular plane, they combine to form a reasonably sharp image of that plane.

In theory, by skewing the pile of 60 films one way and another as illustrated in FIGURES 7 and 9, 59 other planes of detail could be brought into focus. Thus, it is possible radiographically to examine an object at many various depths which could be selected as desired. It will be understood, however, that to handle 60 different films and to have to deal with the normal thickness and the density of the base of each film, the use of a high number of films such as 60 would present a number of physical problems.

According to the present invention, it is intended that other means may be utilized to record information received from radiographic examination of an object. This can be done by transmitting the X-rays toward an X-ray to a light conversion device such as a fluorescent screen or some similar device and then scanning the image, point at a time, with a television camera so that each complete scan can be likened to one of the 60 images mentioned above. Data from each scan, either analog or digital, can be stored in a memory system of a computer and each minute area of the screen and its associated data in the memory system would be identified by suitable coordinates such as row, column and serial number.

To use the stored information, the computer is then instructed to look at the stored information with a prescribed displacement of the data corresponding to the displacement illustrated, for example, in FIGURES 5, 7 and 9. A print-out or display of the sum of the values contained in each column would then correspond to the images appearing in FIGURES 6, 8 and 10. Several approaches exist to the solution of the problem of separating the desired and undesired information, before it is displayed by the computer. One solution would be to compare corresponding points on successive scans orientated in a skewed manner and to recognize only those values which remain constant within prescribed limits and to ignore all other values. Another solution would permit and recognize a prescribed rate of change of values for corresponding and adjacent points on successive scans orientated in a skewed manner. A third solution would take the following form. When a value is found to occur in a specified percentage of the total number of corresponding points on successive scans orientated in a skewed manner, then that value would be reported as the value for this point at all the scans.

It is also possible to use a movie system for recording the results. For example, in FIGURE 11, a subject 30 is positioned between a fluorescent screen 32 and a ray source 34 and suitable laminagraphic equipment is used to shift the ray source relative to the screen and the subject about an axis lying approximately at the center of the subject 30. The screen is shown in a plurality of positions to illustrate its movement. The ray source 34 emits discrete bursts of radiation during the course of its movement in a number which we shall say equals N and as a result N discrete images are created on the fluorescent screen.

A movie camera 35, as shown in FIGURE 11 diagrammatically, which is positioned to move with this screen as a unit, records N images in the selected time period, the camera being operated so that one image of the screen is recorded on each frame of the movie film. To view the data, the movie film is placed in a projector 36 and the images are projected onto an integrating image recording medium 37 such as photographic film or paper or an electro-luminescent image retaining panel. Relative motion between the projector and the image recording medium is arranged so that images of details located at desired depths in the object will always expose the same area on the recording medium and the images of all other details will never expose the same area twice and hence will record as a multitude of non-oriented, under-exposed images which register as blurred images. Details located at different desired depths can be brought into focus by repeating the above process but with the relative motion of the projector and image receiver modified so that the images of details in the new desired plane will register with and always expose the same area on the recording medium.

For example, in FIGURE 12, the images N constitute three shots as illustrated also in FIGURES 1 to 10. The first shot picks up CBA in discrete positions, the second ABC superimposed on each other, the third shot ABC in discrete position. We select "C" plane to observe. By projecting the first shot on a recording medium such as an image retaining panel, we get CBA. Then we shift the recording medium 37 through a suitable distance by means of selector support 38 on a control base 39 so that the "C" of the second shot falls on the same area of the recording medium as did the "C" of the first shot. Next, we project the third shot and shift medium 37 so that the "C" of that shot falls on the "C" of the first shot. In this manner, the "C" plane or lamina shows up clearly on the image retaining panel for visual examination and/or permanent recording if desired. The same system can be used, of course, for any selected number of shots depending on the degree of detail desired.

Reference has been previously made to electronic recording and storage and this will be described now in more detail. Electronic systems are well known to the art and the manner of the use of these systems will be set out without minute detail as to circuitry which can be supplied by those skilled in the art as it exists presently.

It has been pointed out that the directing of penetrating rays, such as X-rays, through a subject onto an image intensifier tube can be accomplished while moving the elements laminagraphically relative to each other. Thus, in FIGURE 1, the radiation from source 22 can be directed through the subject 20 onto an image intensifier tube 24. And this system is shown also by diagram in FIGURE 18.

The electronic recording system has the advantage that the various "bits" of information in each lamina can be picked up individually by the scanning process. To illustrate, a subject such as a cube in FIGURE 14, can be divided into X, Y, Z coordinates from 1 to 5.

Assuming laminagraphic motion which picks up horizontal laminae as the selected orientation, the recording can selectively pick up the image information for each discrete position "N," whether obtained by physical or electronic interruption, and as the laminagraphic process progresses, the information is suitably recorded, and each position is scanned to divide it into bits of information for the particular abscissa and ordinate of the particular position. By superpositioning, then, accomplished electronically to correspond to that previously described with physical repositioning or skewing of the relative planar information, the laminae of the cube of FIGURE 14 can be reconstructed into readable information. In FIGURE 15, for example, the image information of the top lamina of the cube is found. In FIGURE 16 is the bottom lamina.

In addition, by input of three-dimensional recognition pulse in the programming of the computer information, an image information of a vertical lamina can be presented as shown, for example, in FIGURE 17 where the central vertical lamina is presented.

Thus, there may be instances where it is possible to make a laminagraph of a particular part from one position only, because of an obstruction, anatomical or otherwise. But the lamina desired is perpendicular to the lamina normally picked up from the observable position. By the above system, the desired image information can be obtained for a lamina orientation impossible to obtain by standard laminagraphic procedures. Other angled planes and even curved planes can be selected for examination by programming for them.

The above-described method for isolating and imaging planes disposed at an angle to the original plane of the laminagraphy comprises generally obtaining the information in all of a plurality of parallel planes of any predetermined thickness, superpositioning the information laminagraphically obtained to develop discrete information by abscissa and ordinate in the various planes, and storing this information with suitable recognition or orientation signals so that it may be retrieved on certain programming. Since the laminate information is stored with suitable orientation signals, it may then be recalled either in planes parallel to the original laminagraphic action or in planes perpendicular to or at any angle to these original planes.

It will be recognized that the data is obtained line by line due to the electronic scanning procedures. Accordingly, a more direct electronic system involves a programming of the initial information in the multiple images on an abscissa and ordinate signal input basis and then recalling one particular line, for example, the $Y_3$ line (FIGURE 14) from $X_1$ to $X_5$ and $Z_1$ to $Z_5$. When this information is recalled and combined into an image, it would portray information in a plane perpendicular to that of the original laminagraphic orientation.

Reference has been previously made to an illustrative electronic system and in FIGURE 18 a system has been shown. In the diagrammatic presentation, the module 40 contains the X-ray control equipment and the mechanical motion control for moving the X-ray source 42 relative to an axis within the subject 44 and in proper relation to an image intensifier 46. The image intensifier, in essence, photographs a large number of X-ray pictures, each picture corresponding to a position of the X-ray source. Three modules of scan generation equipment are shown at 48, 50 and 52 and these are used in connection with a primary storage module 54, a programmer 56 and a secondary storage module 58 with a read-in section and a read-out section. All of these cooperate to provide a reconstruction in a console and display module 60.

After suitable recognition pulses are added to the scan information, the information is sent to the primary storage module 54 which may be magnetic and/or electrostatic. It could be, for example, magnetic tape.

To use the stored information, a command from the display console 60 causes the programmer 56 to remove information from the storage element, and, after suitable adjustments are made, this information, picture-over-picture, is combined in an integrating mode in the read-in portion of the secondary storage element 58. This element is placed in this position to accomplish the integration of the individual frames to form the composite picture. One example of a unit for accomplishing this purpose is an electrical-electrical storage tube such as RCA 6896/1855 Graphicon. After the information has been placed in secondary storage module 58, the composite picture may be read out of the secondary storage element, and it will be used to display the desired reconstruction on a visual storage tube 60 such as a Memotron made by Hughes. Different enlargements of various sections may be made by compositions of various time-delay and scanning times of the read-out portion of the secondary storage element 58. Image of details lying in various planes other than the one under scrutiny may be minimized by a signal averaging operation which may be performed either before or after the secondary storage element. The secondary storage element may also be photographic film, thermoplastic recording material, the Eidefor oil storage system or possibly another magnetic tape or drum storage element similar to the primary storage element. The programmer element 56 synchronizes the action of the other elements. For example, to form a linear translation of the various frames to gain a different level of focus, one frame, line scan by line scan, will be laid down upon the secondary storage, the first line would be omitted from the second frame, the first and second lines from the third frame, and so forth. To gain another level of focus, the first frame will be laid down, then the first two scans omitted from the second frame, and the first four scans omitted from the third frame and so forth. Translation in the direction perpendicular to the one mentioned above is gained by suitable time delays in recording the scan information, the delay times being increased in equal increments for each frame as it is recorded.

Circular, spiral, elliptical or hypocycloidal scanning procedures are achieved by suitably programming combinations or scan line shifting and time delays inside the scan lines.

Similarly, the presentation of the information in the third dimension as described in connection with FIGURE 17 can be accomplished by proper programming for recall of "bit" information in the desired plane.

In general, the above system contemplates as desirable, the creation of seriatim, discrete views of a subject throughout a particular time period, but this may be accomplished in a number of ways. With a 60-cycle ray source operating through a one-second exposure, there will be 60 views recorded. With a movie camera recording, the number N of the views can be selected. With a steady ray source, a shutter interruption would achieve the discrete image separation. With an electronic recording, the image separation can readily be accomplished by scan equipment.

What is claimed as new is as follows:

1. A method of utilizing laminagraphy in radiology which comprises:
    (a) exposing a subject to a ray source of penetrating radiation,
    (b) recording a plurality of images of the subject on an image receiver while altering the relative position of the ray source, the subject, and the image receiver according to laminagraphic principles, and
    (c) recombining said images in superimposition in a plurality of selected orientations to bring areas of similar exposure into registry to reconstruct images of a selected lamina within the subject.

2. A method of utilizing laminagraphy in radiology which comprises:
   (a) exposing a subject to a ray source of penetrating radiation,
   (b) recording a plurality of images of said subject a predetermined number of times throughout said time period on an image receiver moving laminagraphically with respect to said ray source and said subject,
   (c) storing information of said plurality of images for recall, and
   (d) arranging said images for simultaneous read-out in superimposition in a plurality of positions of planar shift to bring into registry similar information from each said images specific to a particular plane of said subject to permit examination of said subject at selected varying depths.

3. A method of utilizing laminagraphy in radiology which comprises:
   (a) exposing a subject to a ray source of penetrating radiation,
   (b) recording a plurality of images of the subject a predetermined number of times throughout said time period on a receiver moving laminagraphically with respect to said ray source and said subject,
   (c) storing information of said plurality of images for recall, and
   (d) arranging said images for simultaneous read-out with said information superposed in a plurality of positions of planar shift to bring into registry identical portions of the image of said subject to reconstruct images of said subject at selected varying depths.

4. A method as defined in claim 3 in which said recording is accomplished on a plurality of radiologically sensitive film plates and said read-out is accomplished by overlying and shifting said film to register simultaneously the images of a selected plane.

5. A method as defined in claim 3 in which said recording is accomplished seriatim on a plurality of frames of moving film and said read-out is accomplished by projecting each frame in seriatim on a recording plane which is shifted with the projection of each frame to register the images of a selected plane.

6. A method of utilizing laminagraphy in radiology which comprises:
   (a) exposing a subject to a ray source of penetrating radiation,
   (b) recording a plurality of images of the subject on an image receiver while altering the relative position of the ray source, the subject, and the image receiver according to laminagraphic principles, and
   (c) recombining said images to reveal the image information for any selected lamina depth of said subject by causing simultaneous registration of the image information of the selected lamina from each image.

7. A method of utilizing laminagraphy in radiology which comprises:
   (a) exposing a subject to a ray source of penetrating radiation,
   (b) recording a plurality of images of the subject on an image receiver while altering the relative position of the ray source, the subject, and the image receiver according to laminagraphic principles, and
   (c) recombining said images to reveal the image information for any selected lamina depth of said subject by creating a cumulative impression in register of the image information of the selected lamina from each image.

8. A method of utilizing laminagraphy in radiology which comprises:
   (a) exposing a subject to a ray source of penetrating radiation,
   (b) recording a plurality of images of the subject on an image intensifier while altering the relative position of the ray source, the subject, and the image intensifier according to laminagraphic principles,
   (c) scanning said images seriatim of record coordinate bits of information in each image, and
   (d) selectively making available image information for any particular selected lamina within said subject by impressing images of said selected lamina in registration on a display plane.

9. A method of utilizing laminagraphy in radiology which comprises:
   (a) exposing a subject to a ray source of penetrating radiation,
   (b) recording a plurality of images of the subject on an image intensifier while altering the relative position of the ray source, the subject, and the image intensifier according to laminagraphic principles,
   (c) scanning said images seriatim to record coordinate bits of information in each image, and
   (d) selectively making available image information for any particular selected lamina within said subject by causing registration of the bit information from each image which is specific to the selected lamina to effect a cumulative visible signal image of the image information of the selected lamina.

10. A method of utilizing laminagraphy in radiology which comprises:
    (a) exposing a subject to a ray source of penetrating radiation,
    (b) recording a plurality of images of the subject on an image intensifier while altering the relative position of the ray source, the subject, and the image intensifier according to laminagraphic principles,
    (c) scanning said images seriatim to record coordinate bits of information with three-dimensional recognition pulse information, and
    (d) selectively making available image information for any particular selected lamina in any of three dimensions of said subject.

11. A method of utilizing laminagraphy in radiology which comprises:
    (a) exposing a subject to a ray source of penetrating radiation,
    (b) recording a plurality of images of the subject on an image intensifier while altering the relative position of the ray source, the subject, and the image intensifier according to laminagraphic principles to obtain image information of a plurality of parallel lamina in a predetermined orientation,
    (c) scanning said images seriatim to record coordinate bits of information in each image,
    (d) storing said information with a recognition pulse information,
    (e) selectively making available image information for any particular selected lamina within said subject by causing registration of the bit information from each image which is specific to the selected lamina to effect a cumulative visible image of the image information of the selected lamina,
    (f) storing said lamina information in coordinate bits for each parallel lamina of the predetermined orientation with three-dimensional recognition pulse information, and
    (g) selectively making available image information for any particular selected lamina in any orientation of three dimensions of said subject.

12. A method of creating observable laminal planes of a three-dimensional object by the use of radiological rays which comprises:
    (a) exposing a three-dimensional object to a ray source of penetrating radiation from a plurality of spaced positions on one side of said object,
    (b) recording penetrating radiation on an image receiver at a plurality of locations on the other side of said object, each location being on a line including said object and a position of a ray source,
(c) developing said image receivers to produce a film for each exposure,
(d) overlying the films against a light source and moving the films relative to each other in the direction of the plane of the films to positions wherein detail of a selected laminal plane is brought into registry in all of said films to permit maximum light to pass and thus facilitate examination of detail in such various planes individually.

13. A method of creating observable laminal planes of a three-dimensional object by the use of radiological rays which comprises:
(a) positioning radiologically sensitive plates at a plurality of positions on one side of a subject,
(b) exposing said plates to radiological rays emanating from a plurality of positions on the other side of said subject, each exposure passing through said subject, said exposure being generally less than the exposure necessary to give maximum contrast in said plates,
(c) developing the plates to produce a film for each exposure,
(d) overlying the films against a light source and moving the films relative to each other in the direction of the plane of the films to positions wherein detail of one particular laminal plane is brought into registry in all of said films to permit maximum light to pass and thus facilitate examination of detail in such various planes individually.

14. A method of creating observable laminal planes of a three-dimensional object by the use of radiological rays which comprises:
(a) exposing a three-dimensional object to a ray source of penetrating radiation from a plurality of spaced positions on one side of said object,
(b) recording penetrating radiation on an image receiver at a plurality of locations on the other side of said object, each location being on a line including said object and a position of a ray source,
(c) storing said plurality of images wherein the information received at each location may be retrieved and brought to a plane of display, and
(d) displaying the information of said plurality of images in superimposed relationship in selected positions of planar shift to register data from any one plane of location of the subject to highlight said data to permit inspection of detail in various selected lamina.

15. A method of creating observable laminal planes of a three-dimensional object by the use of radiological rays which comprises:
(a) exposing a three-dimensional object to a ray source of penetrating radiation from a plurality of spaced positions on one side of said object,
(b) recording penetrating radiation on an image receiver at a plurality of locations on the other side of said object, each location being on a line including said object and a position of a ray source,
(c) establishing said recordings as permanent retrievable records,
(d) superimposing said records at a read-out plane, and
(e) shifting said superimposed records in said read-out plane to match various contrasting portions to bring into focus various laminal planes of said subject for individual inspection.

References Cited

UNITED STATES PATENTS

| | | | |
|---|---|---|---|
| 2,207,867 | 7/1940 | Loebell | 250—61.5 |
| 3,076,054 | 1/1963 | Simon | 250—60 X |

RALPH G. NILSON, Primary Examiner

A. L. BIRCH, Assistant Examiner

U.S. Cl. X.R.

250—60, 61, 65